(12) United States Patent
Schneider et al.

(10) Patent No.: US 6,403,950 B1
(45) Date of Patent: Jun. 11, 2002

(54) METHOD OF PRODUCING A CARRIER FREQUENCY MODULATED SIGNAL

(75) Inventors: Eckart Schneider, Zorneding; Roland Schaefer, Rechtenbach; Jan Stamer, Wetzlar, all of (DE)

(73) Assignee: Corrsys-Datron, Wetzlar (DE)

( * ) Notice: Subject to any disclaimer, the term of this patent is extended or adjusted under 35 U.S.C. 154(b) by 0 days.

(21) Appl. No.: 09/600,293

(22) PCT Filed: Mar. 22, 1999

(86) PCT No.: PCT/DE99/00813

§ 371 (c)(1),
(2), (4) Date: Jul. 14, 2000

(87) PCT Pub. No.: WO00/29816

PCT Pub. Date: May 25, 2000

(30) Foreign Application Priority Data

Nov. 16, 1998 (DE) .......................................... 195 52 666

(51) Int. Cl.$^7$ .................................................. G01B 9/02
(52) U.S. Cl. .............................. 250/237 R; 250/237 G; 356/395; 356/398
(58) Field of Search ........................ 250/237 G, 237 R, 250/231.13; 356/28, 398, 395, 485, 486, 488, 499, 521

(56) References Cited

U.S. PATENT DOCUMENTS

| | | | |
|---|---|---|---|
| 3,891,321 A | * | 6/1975 | Hock et al. .................. 356/488 |
| 3,904,295 A | * | 9/1975 | Hock et al. .................. 356/398 |
| 4,071,297 A | | 1/1978 | Leitz et al. |
| 5,225,830 A | | 7/1993 | Andermo et al. |
| 5,483,059 A | | 1/1996 | Igaki et al. |

FOREIGN PATENT DOCUMENTS

| | | |
|---|---|---|
| DE | 27 365 83 C2 | 2/1973 |
| DE | 23 30 940 | 2/1975 |
| DE | 40 09 737 A1 | 3/1990 |
| DE | 40 30 985 A1 | 1/1992 |

OTHER PUBLICATIONS

R. Schaefer, J. Schwab, and N. Lauinger, "New Developments in Optical Grating Technology for Machine Vision and Industrial Sensors", SPIE vol. 3208, pp. 428–436.

* cited by examiner

*Primary Examiner*—Stephone B Allen
(74) *Attorney, Agent, or Firm*—Foley & Lardner

(57) ABSTRACT

A method for generating a carrier frequency-modulated signal for the evaluation of n>2 photoelectric measurement signals which are generated by imaging a structured surface onto a spatial frequency filter and are phase-shifted with respect to one another is distinguished by the fact that the amplitudes of the measurement signals are serially interrogated in a predetermined interrogation cycle with a constant clock rate, and a sinusoidal signal is formed by filtering from the signal train, the carrier frequency of which signal is determined by the time for an interrogation cycle.

14 Claims, 8 Drawing Sheets

METHOD OF PRODUCING A CARRIER FREQUENCY MODULATED SIGNAL

BACKGROUND OF THE INVENTION

The invention relates to a method for generating a carrier frequency-modulated signal for the evaluation of n>2 photoelectric measurement signals which are generated by imaging a structured surface onto a spatial frequency filter and are phase-shifted with respect to one another.

Methods in which measurement signals are generated by imaging a structured surface onto a spatial frequency filter are known. Optical lens systems are usually used for the imaging. The structure of the surface may be regular or else stochastic. The spatial frequency filter comprises a regular grating structure in the form of an amplitude grating or a phase grating. The light fluxes passing through the spatial frequency filter are usually imaged onto a photoelectric receiver by a field lens. However, it is also known to design the structure elements of the spatial frequency filter as photoelectric receiver areas, so that measurement is effected directly in the plane of the spatial frequency filter.

In the event of a movement of the structured surface relative to the structure of the spatial frequency filter, alternating signal amplitudes are produced at the photoelectric receivers. The movement may take place parallel to the plane of the spatial frequency filter. The signal change at the photoelectric receiver is then proportional to the distance of movement or speed of movement of the imaged surface. Systems having a regular surface structure which operate according to this system are known as incremental transmitters for linear or angular movements. Systems having a stochastic surface structure are also known as correlation optical distance and speed measurement systems.

However, the movement may also take place perpendicularly to the plane of the spatial frequency filter, in which the case the signal change depends on the quality of the imaging on the spatial frequency filter. In the event of sharp imaging, the spatial frequency of the imaged surface correlates optimally with the spatial frequency of the filter.

One problem in optically modulated measurement methods generally consists in high continuous light components in relation to the modulated light component. It is known, for the purpose of suppressing continuous light, to generate two signals which are phase-shifted by 180° with respect to one another, and to superpose said signals on one another, so that the signal components corresponding to the continuous light cancel one another out.

In the case of an amplitude grating as spatial frequency filter, it is possible to provide different filter areas in which the grating structures are offset in phase by 180° with respect to one another. In the case of phase gratings, it is possible to choose e.g. prism-type grating structures in which the light fluxes defracted at the two prism flanks are geometrically separated and phase-shifted by 180° with respect to one another. In the case of photosensitive spatial frequency filter structures, alternately successive receiver strips can be connected together and the signals can be electronically phase-shifted by 180° with respect to one another.

A further problem in such measurement systems is that of identifying the direction for the movement of the structured surface relative to the structures of the spatial frequency filter. For this purpose, it is known e.g. to generate two measurement signals which are phase-shifted by 90° with respect to one another and define a rotating electric field.

In the case of amplitude gratings as spatial frequency filters, it is again possible to provide, to that end, different filter areas in which the grating structures are offset in phase by 90°. In the case of phase gratings, it is possible to provide e.g. prism-type grating structures having more than two flanks inclined differently with respect to one another. The different light fluxes are assigned respectively separate photoelectric receivers. The light fluxes are modulated when the structured surface moves perpendicularly to the structure of the spatial frequency filter. The direction of movement can be derived from the comparison of the modulation phases.

In the case of a chessboard-like or pyramidal structure of the spatial frequency filter, modulated light fluxes can be generated for two coordinate directions of the movement and be measured by suitably arranged photoelectric receivers.

The light fluxes imaged onto said photoelectric receivers represent an image of the pupil of the system which images the structured surface. It is known to assign e.g. two separate receivers to each pupil image, with the result that said receivers each receive light fluxes which have passed through different pupil areas. By suitably evaluating the spatial frequency-filtered signals assigned to the different pupil areas, it is possible to determine the position of the focal plane of the image of the surface relative to the plane of the spatial frequency filter. The distance between the surface and the imaging system can then also be derived from this.

All of the systems mentioned previously have the disadvantage that the signal modulation becomes worse and worse in the event of slow movements and a measurement signal can no longer be obtained at a standstill. In order to solve this problem, it is known to move the spatial frequency filter at a known speed in one direction or periodically in oscillations, and hence to modulate the actual measurement signal. This method, which is known as carrier frequency modulation, allows e.g. signal evaluation by phase-sensitive rectification with the carrier frequency as reference.

This method is particularly advantageous in the evaluation of the signals for the setting of the focusing of the imaged surface onto the spatial frequency filter. The carrier frequency-modulated measurement signals of the photoelectric receivers assigned to the different pupil areas have the same phase relative to the carrier frequency only in the event of sharp imaging, with the result that either the correspondence of the carrier frequency-modulated measurement signals or the correspondence of the phases gives a very sensitive setting criterion.

In the case of a spatial frequency filter arranged on a circular disk, the movement may be effected by rotation. Owing to the grating constant, which becomes coarser in the radially outward direction, however, different carrier frequency modulations are produced in the measurement field and make the signal evaluation more difficult. In general, a linear movement in one direction can be realized only over a very limited length. If the spatial frequency filter is arranged on the curved surface of a rotating drum, the spatial frequency filter is curved, with the result that sharp imaging is not possible over the entire filter surface.

Therefore, an oscillatory movement is preferred in practice. For this purpose, the spatial frequency filter may, for example, be suspended from piezoelectric bending devices or be moved back and forth by a suitable linear drive (DE 23 30 940 C2). The disadvantage of this arrangement resides in the signal evaluation, since, depending on the position of the structures on the imaged surface relative to the displacement of oscillation of the spatial frequency filter given an amplitude of oscillation of ± half a grating constant, the carrier frequency modulation is effected both with the fundamental and with the first harmonic of the carrier frequency. Therefore, the phase-sensitive rectification must be carried out with regard to the carrier frequency and twice the frequency with respect thereto (DE 27 36 583 C2). A further difficulty arises in measurement arrangements which measure simultaneously in two coordinate directions. In this case, the oscillatory movement has to be performed at 45° with respect to the coordinate axis in order to obtain the same carrier frequency modulation for the two measurement directions.

A summarizing account can be found in the paper "New developments in optical grating technology for machine vision and industrial sensors", by R. Schaefer, J. Schwab, N. Lauinger, in Proc. SPIE, Vol. 3208, pp. 428–436, (October 1997).

A fundamental disadvantage of the known methods of carrier frequency modulation consists in the fact that the speed of movement of the spatial frequency filter is limited on account of the latter's mass, the energy requirement and the mechanical embodiment. This is of crucial importance since, on the basis of the theorem known as the Shannen criterion, it is possible to evaluate without errors only half the speed of movement of the structured surface to be measured relative to the modulation speed. As a result, therefore, limits are also specified for the measurable speed of the surface.

Added to this are interfering effects on the elements that are moved due to external accelerations and vibrations in the whole system due to the movement of masses.

SUMMARY OF THE INVENTION

Therefore, the invention was based on the object of specifying a method for carrier frequency modulation of spatial frequency-filtered measurement signals, which manages without mechanically moved elements, permits modulation frequencies as high as desired in comparison with the signal changes to be measured and can be used in all the abovementioned measuring arrangements in which more than two measurement signals which are in a predetermined phase relationship with respect to one another are generated.

In the case of a method of the type mentioned in the introduction, this object is achieved according to the invention by virtue of the fact that the amplitudes of the measurement signals are serially interrogated in a predetermined interrogation cycle with a constant clock rate, and a sinusoidal signal is formed by filtering from the signal train, the carrier frequency of which signal is determined by the time for an interrogation cycle. In this case, the clock rate should be greater than twice the speed of the amplitude change in the interrogated measurement signal.

Given n measurement signals phase-shifted by in each case 360°/n with respect to one another, the interrogation cycle is expediently effected according to the pattern 1, 2, 3, . . . n, 1, 2, 3, . . . n, . . . and thus simulates a linear movement in one direction. Another interrogation cycle may be effected according to the pattern 1, 2, 3, . . . n, n–1, . . . 2, 1, 2, . . . and thus simulates an oscillatory movement. Preferably, a second interrogation cycle is carried out in parallel with the first interrogation cycle, said second interrogation cycle being shifted by one measurement signal in the case of consecutive numbering 1, . . . , n of the measurement signals, and a second signal, phase-shifted by 360°/n, is formed from this. In an advantageous manner, separate pupil areas of the imaging are in each case assigned n measurement signals phase-shifted by 360°/n with respect to one another, the measurement signals assigned to the respective pupil areas are interrogated in parallel in an interrogation cycle and a signal is formed from the signal trains thus obtained for each pupil area.

In conventional methods of carrier frequency modulation, the time characteristic of each individual measurement signal is modulated. Therefore, four carrier frequency-modulated measurement signals are present given that there are usually four measurement signals each phase-shifted by 90° relative to one another. According to the invention, the amplitudes of the four measurement signals are successively observed, in a snapshot as it were, at a constant time interval. The interrogation must be effected fast enough to enable the amplitudes at the four receivers to be regarded as static over the duration of the interrogation cycle. The four temporally successive amplitude values serve as interpolation points for the reconstruction of a sinusoidal signal. Such reconstruction is known per se and can be produced e.g. by means of suitable low-pass filtering. It is known from signal theory that more than two interpolation points are required for an unambiguous sine curve. In practice, this means that at least three measurement signals with a fixed phase relationship are necessary. Since interrogation is effected in each case with a constant clock rate, this by itself produces a carrier frequency signal with a frequency in accordance with the duration of an interrogation cycle and a phase which is determined by the interrogation clock. It is evident that the carrier frequency can be adapted to all measurement requirements in a simple manner by way of the interrogation speed.

As long as there is no relative movement between the image of the structured surface and the spatial frequency filter, the measurement signals have static values. As a result of the interrogation, however, a sine wave is generated whose frequency is identical to the carrier frequency and whose phase results from the ratio between the amplitude values. As soon as the image is displaced, altered amplitude values are obtained in the next interrogation cycle and, after filtering, again produce a sinusoidal signal at the carrier frequency, the phase of which signal, however, has shifted proportionally to the image displacement. By means of phase-sensitive rectification with the carrier frequency as reference, it is possible to measure the phase shift and hence determine the displacement distance of the imaged surface in a manner known per se. If a second interrogation cycle shifted by one measurement signal is used in parallel with this, then two signals phase-shifted by 90° are obtained, that is to say a rotating field which also contains the direction information.

During the interrogation cycle, which simulates carrier frequency modulation in accordance with an oscillatory movement by ± half a grating period, a signal characteristic is produced, and the latter changes in the event of relative movement of the image of the structured surface between the fundamental of the carrier frequency and the first harmonic. In this case, a single signal output is sufficient to generate a rotating field if phase-sensitive rectification is effected separately for fundamental and harmonic by means of the interrogation cycle.

A further advantage of the method according to the invention may be seen in the fact that even in the case of measuring arrangements for two coordinate directions, carrier frequency-modulated signal evaluation is now possible without difficulty in an image plane with grating structures which are perpendicular to one another.

For the spacing measurement according to the pupil division method described, e.g. all left-hand and all right-hand pupil halves are in each case combined to form an interrogation cycle and correspondingly processed further in an identical fashion. The phase-sensitive rectification is omitted in this case. A sinusoidal carrier frequency is obtained for each pupil half from the signals obtained by the interrogation cycle, which carrier frequency differs in terms of its phase angle depending on the difference in distance from the focal plane.

BRIEF DESCRIPTION OF THE DRAWINGS

The invention is described in more detail below with reference to schematic illustrations, in which.

DETAILED DESCRIPTION OF PREFERRED EMBODIMENTS

Figure 1:
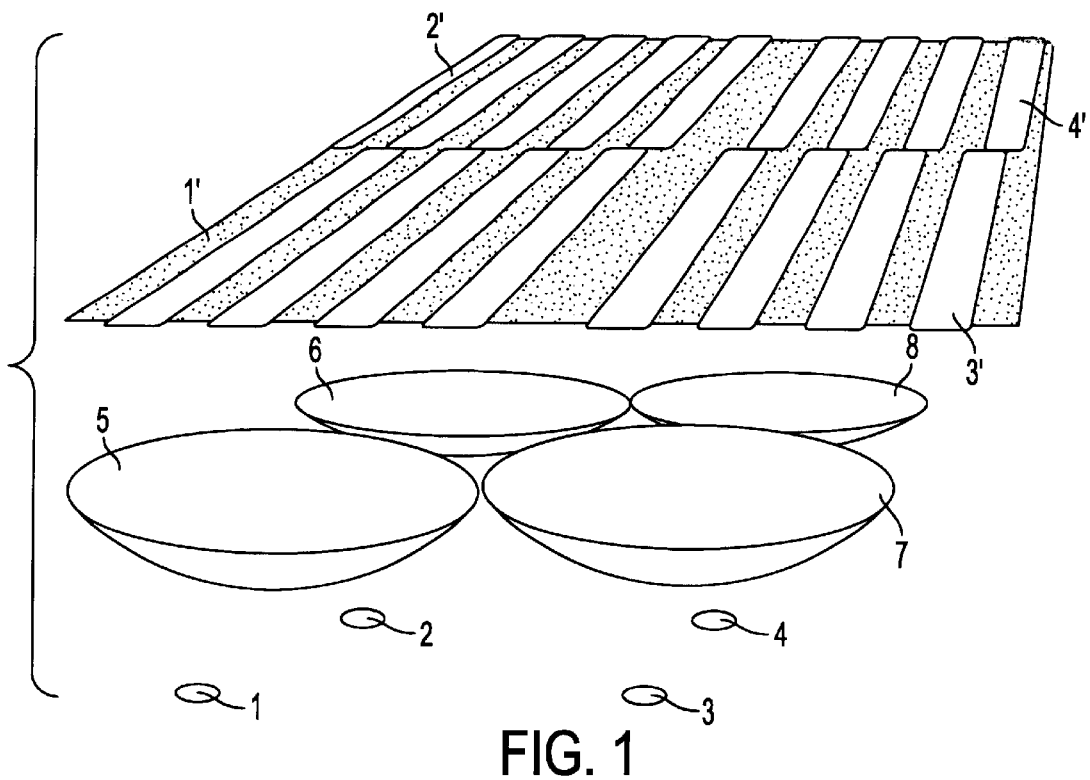
FIG. 1 shows an amplitude grating as a spatial frequency filter with four fields
Figure 2:
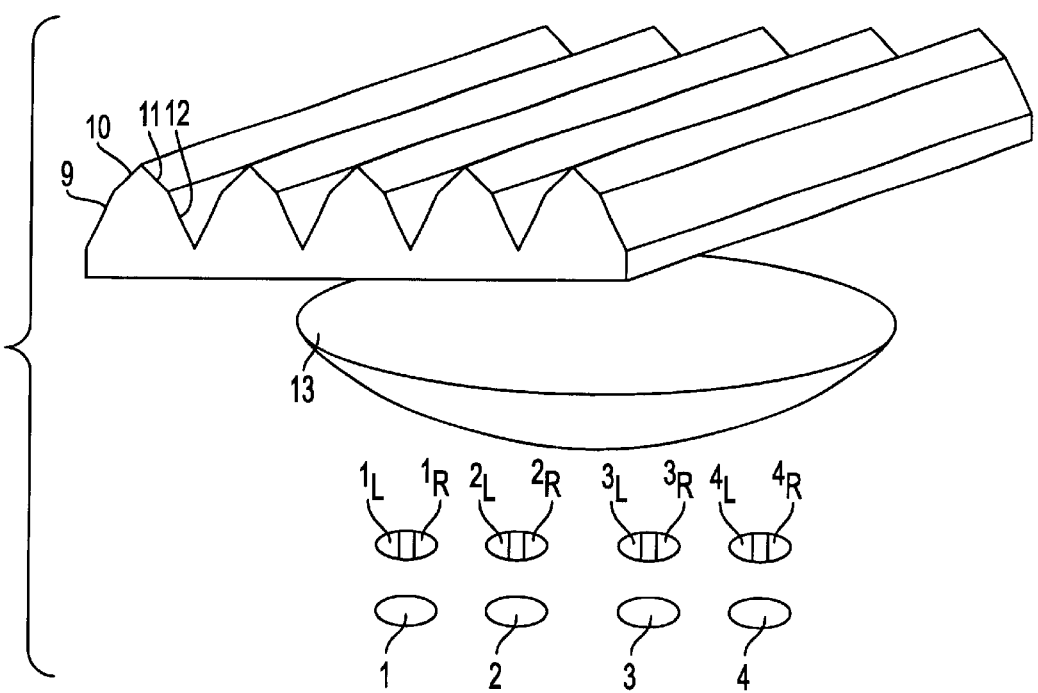
FIG. 2 shows a phase grating as a spatial frequency filter with four flanks

In the case of the phase grating illustrated in FIG. 2, the prism webs have four differently inclined flanks 9, 10, 11, 12. In this case, a single field lens 13 is arranged downstream of the spatial frequency filter and directs the light fluxes diffracted at identical flanks onto the photoelectric receivers 1, 2, 3, 4, which, in this case, may be arranged lying next to one another in a row.

For a spacing measurement according to the pupil division method, the receivers can be divided into respective receiver pairs $1_L$, $1_R$; $2_L$, $2_R$; $3_L$, $3_R$; $4_L$, $4_R$, in accordance with the arrangement illustrated as an alternative. Such arrangements are also known per se.

Figure 3:
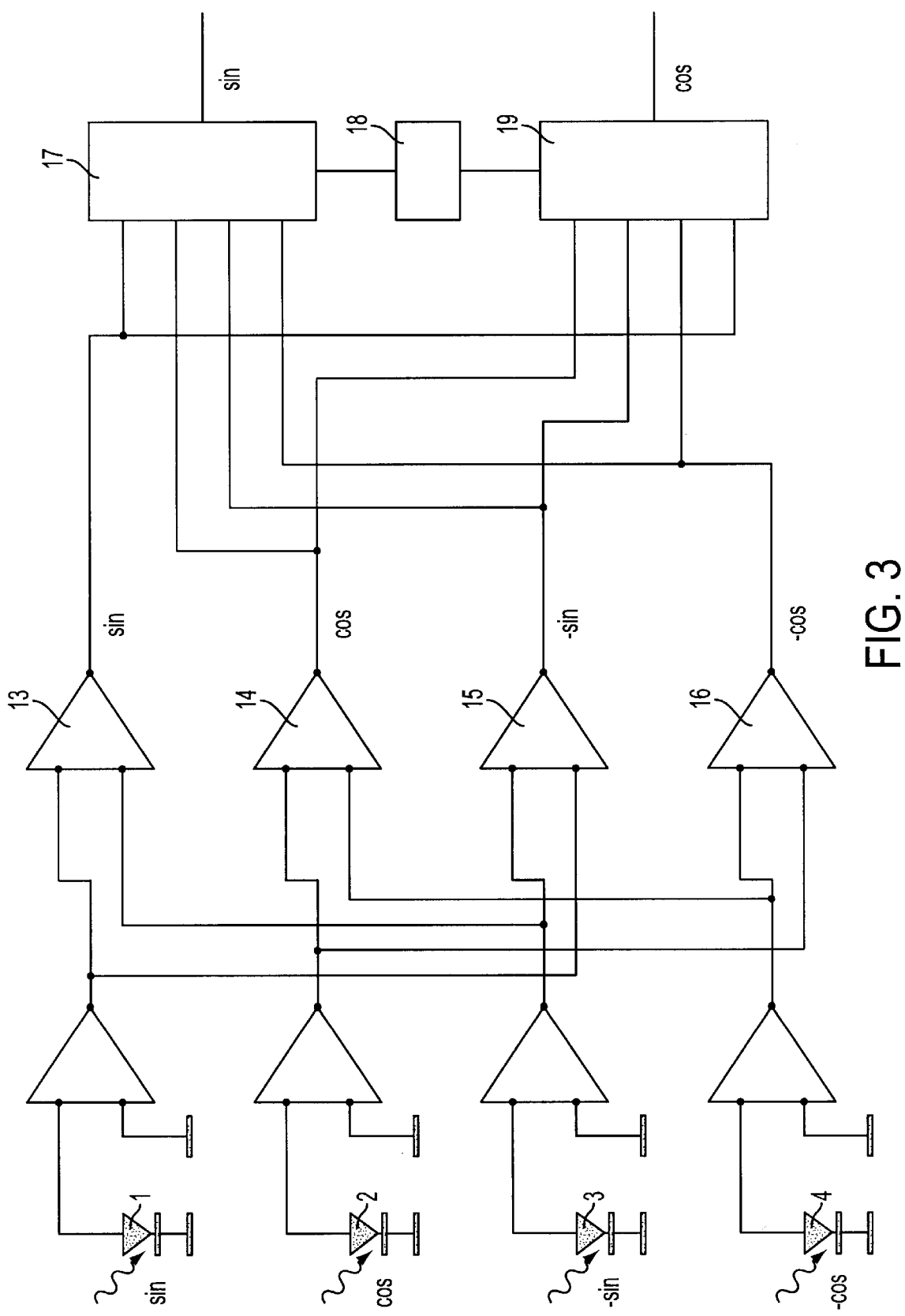
FIG. 3 shows an evaluation circuit

The evaluation circuit illustrated in FIG. 3 exhibits the photoelectric receivers 1, 2, 3, 4. The designations sin, cos, –sin, and –cos indicate that the measurement signals at these receivers are phase-shifted in each case by 90° with respect to one another since they receive light fluxes from the different spatial frequency filter areas. The measurement signals are amplified and fed to differential amplifiers 13, 14, 15, 16. The measurement signals phase-shifted by 180° with respect to one another are respectively present at the signal inputs, with the result that the suppression of continuous light occurs here.

The output signals of the differential amplifiers are fed to an interrogation and filter device 17, which is controlled via a clock generator 18. The carrier frequency-modulated signals appear at the output of the interrogation and filter device 17. In an interrogation and filter device 19, which is likewise controlled by the clock generator 18, an interrogation cycle shifted by one measurement signal in the interrogation can be executed in parallel. The two output signals are then phase-shifted by 90° with respect to one another, as is indicated by the designations sin and cos, and can be evaluated in a known manner in order to determine the direction of movement. The likewise known means for phase-sensitive rectification and determination of the displacement distance are not illustrated in any specific detail.

In the case of evaluation according to the method of pupil division, separate evaluation circuits are required for the receiver groups assigned to the left-hand and right-hand pupil areas. The distance can be determined directly from the phase difference between the two sine signals present at the output.

In FIG. 4, the carrier frequency-modulated signals for an interrogation cycle according to the pattern 1-2-3-4-1-2-3-4 . . . are illustrated in the left-hand half of the figure. The amplitude values are normalized to one, and the time axis shows arbitrary units. A first series formed of dark squares standing on an apex corresponds to a thereotically calculated signal characteristic, the discrete values having a separation of 30° in each case. A second series of static amplitude values are specified as lighter squares, and they correspond to the coverage of the area of the receivers 1, 2, 3, 4, illustrated in the right-hand half of the figure, by a pupil image represented as a circular disk. As is evident, the values correspond to the theoretically expected signal characteristic.

Figure 4A:
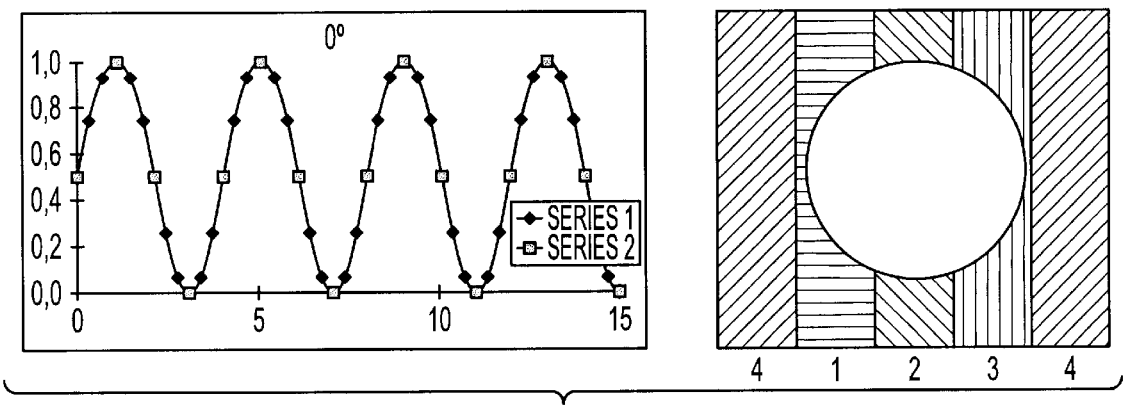
FIGS. 4a–i show a carrier frequency-modulated signal train with linear sampling
Figure 4B:
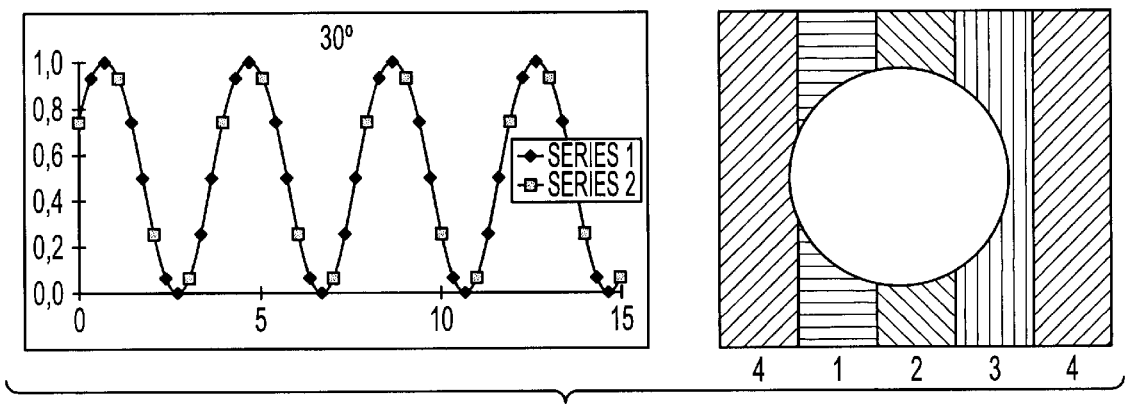
Figure 4C:
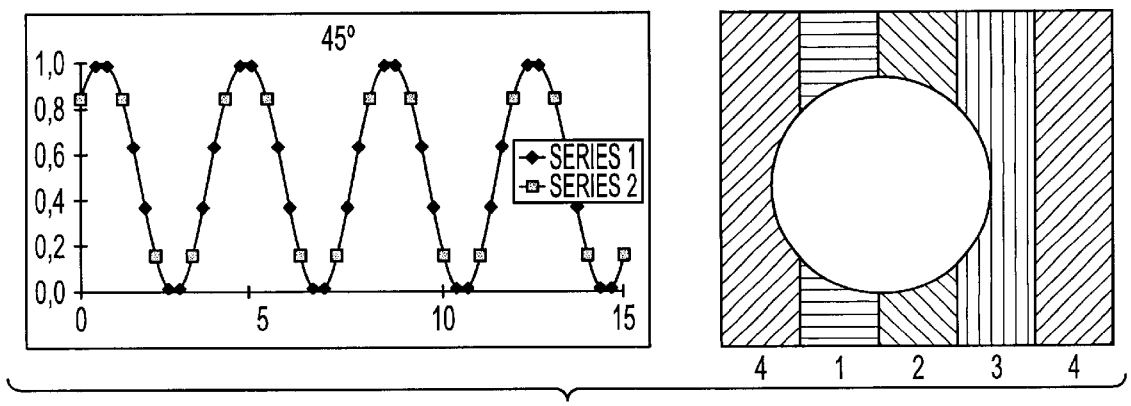
Figure 4D:
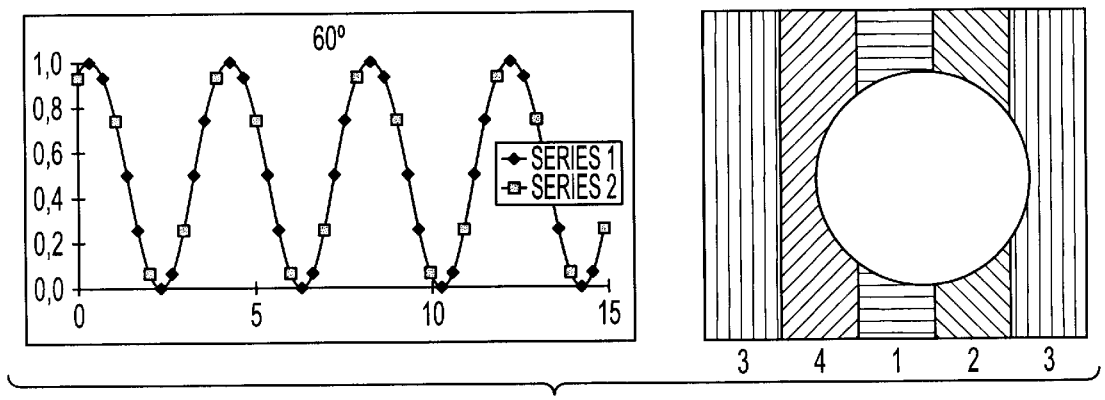
Figure 4E:
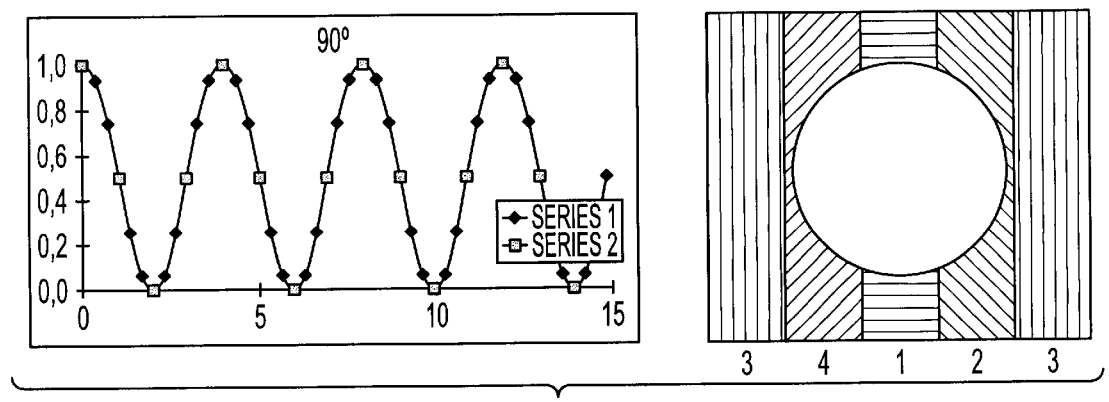
Figure 4F:
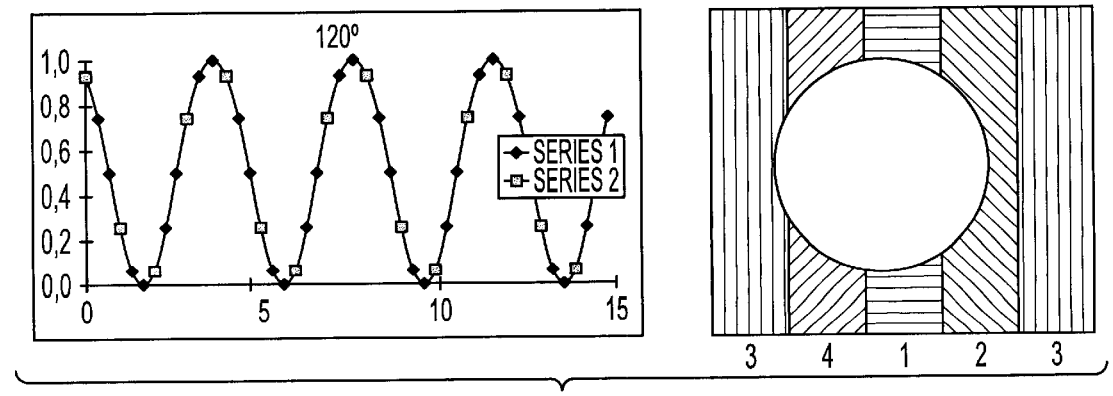
Figure 4G:
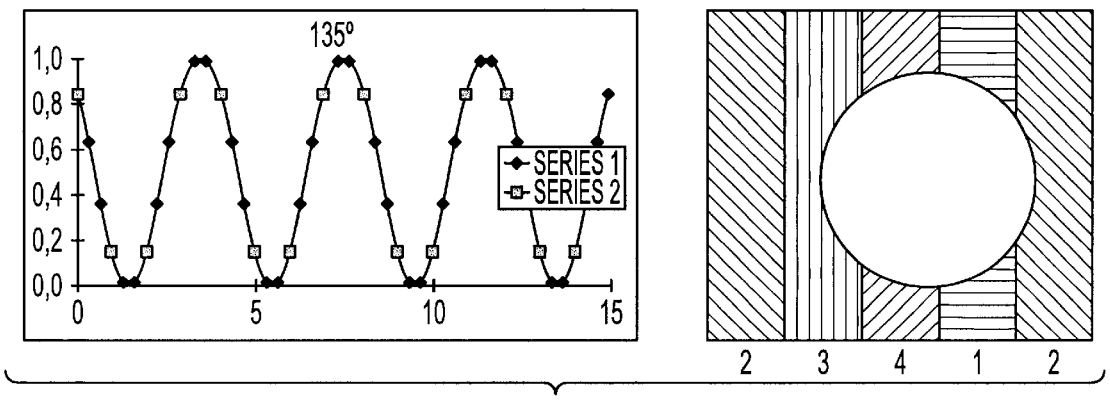
Figure 4H:
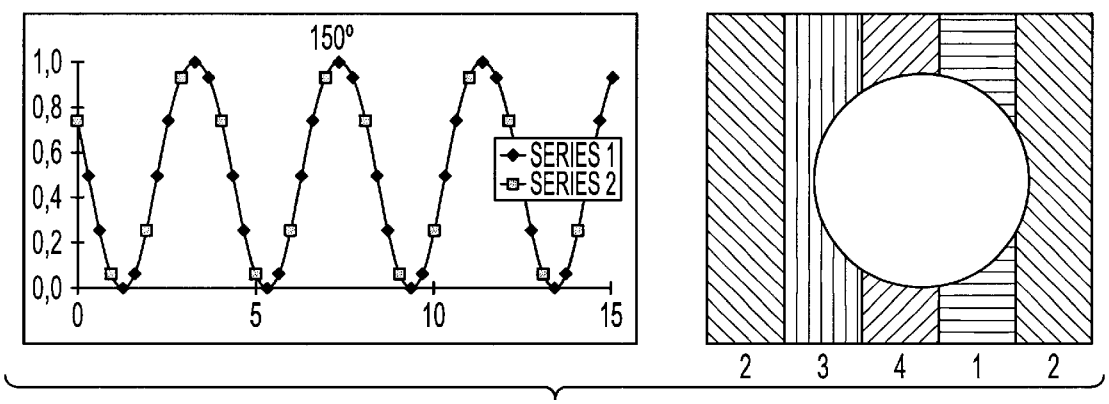
Figure 4I:
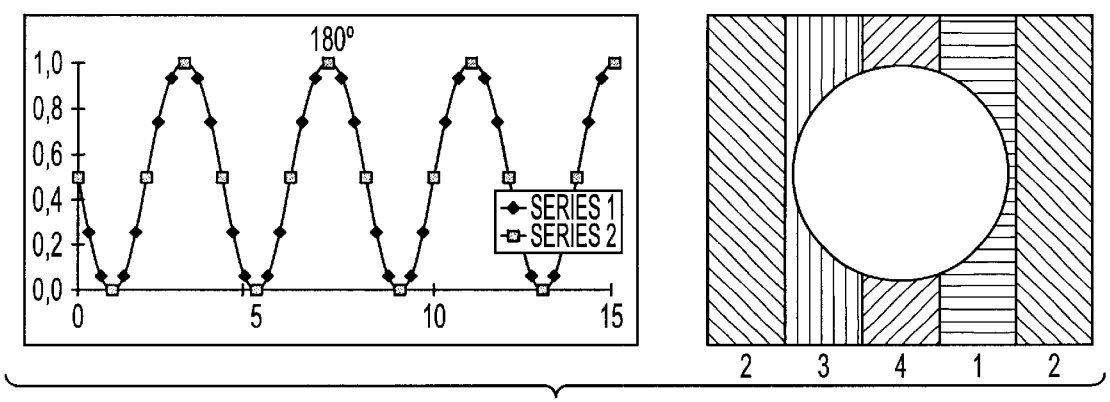
Figure 5A:
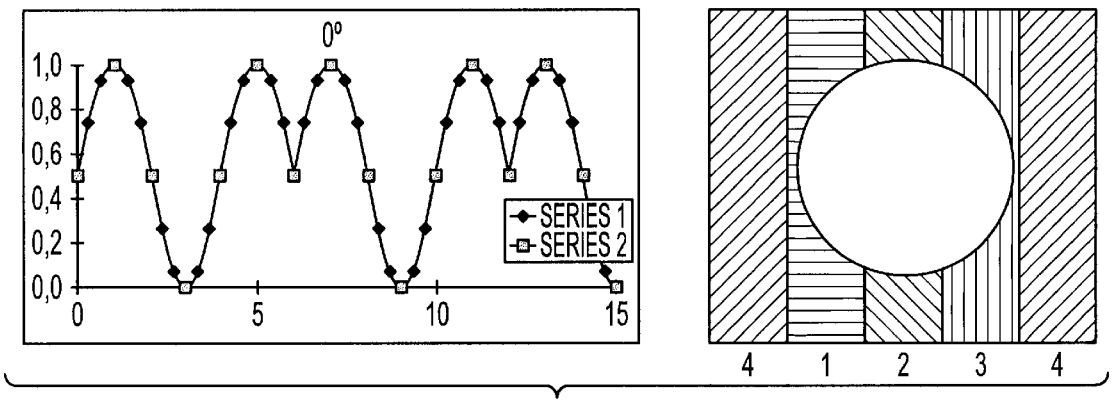
FIGS. 5a–i show a carrier frequency-modulated signal train with oscillatory sampling In the case of the amplitude grating illustrated in FIG. 1, the grating rulings in the four fields 1', 2', 3', 4' are respectively offset by 90° relative to one another. Field lens 5, 6, 7, 8 are arranged downstream of each of the fields and direct the spatial frequency-filtered light fluxes of the individual fields onto photoelectric receivers 1, 2, 3, 4. Such an arrangement is known per se.
Figure 5B:
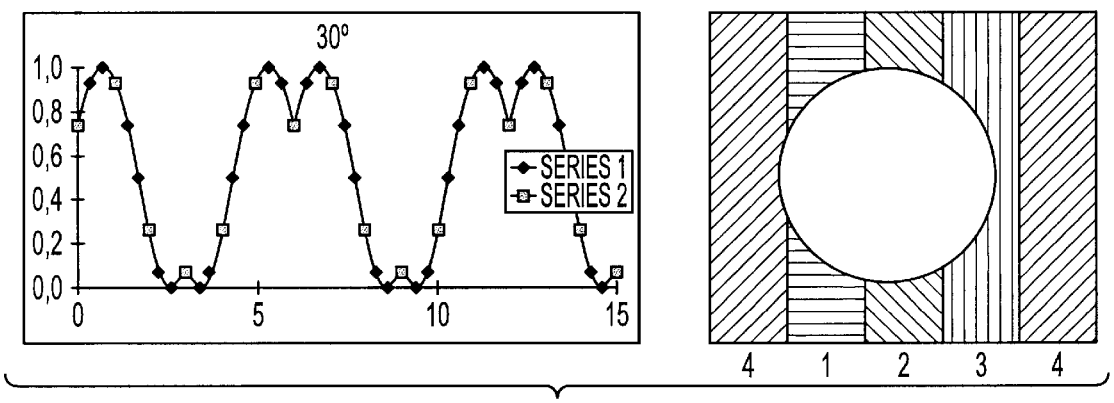
Figure 5C:
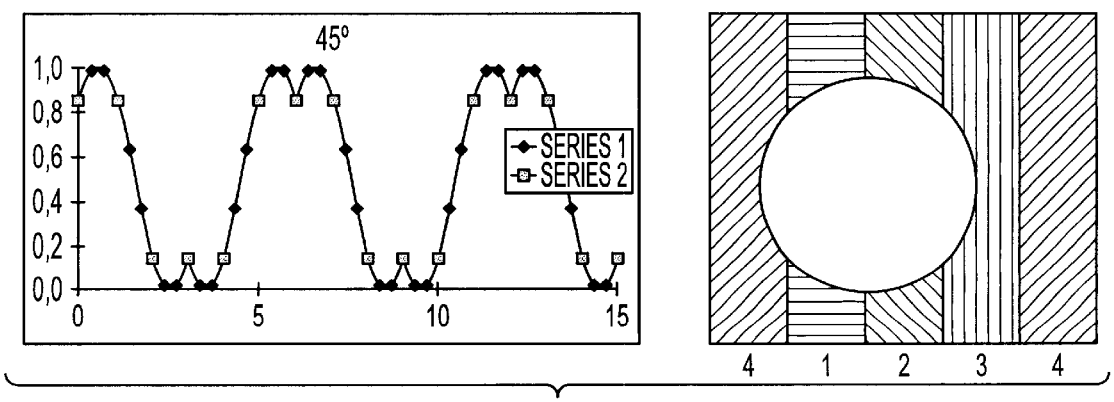
Figure 5D:
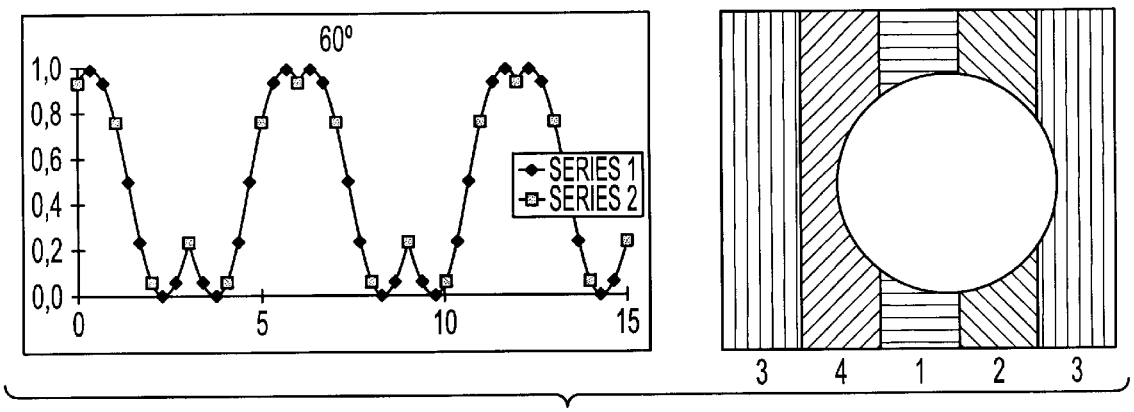
Figure 5E:
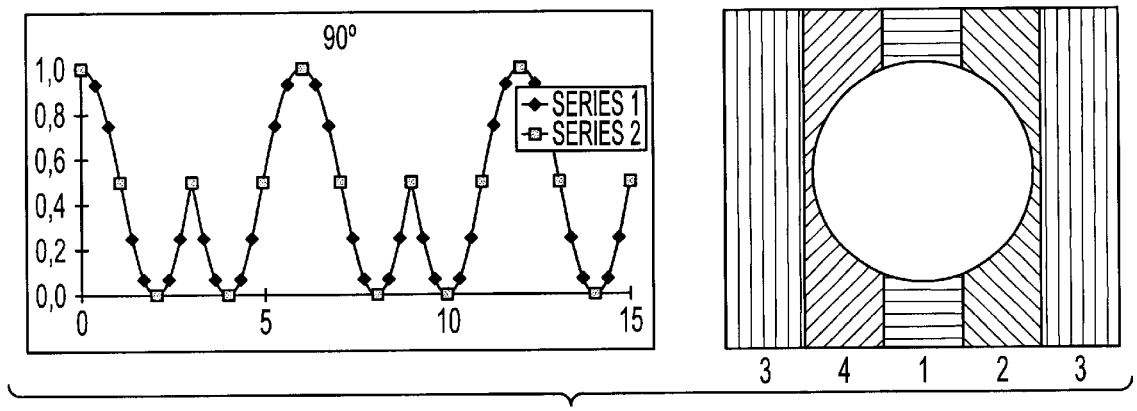
Figure 5F:
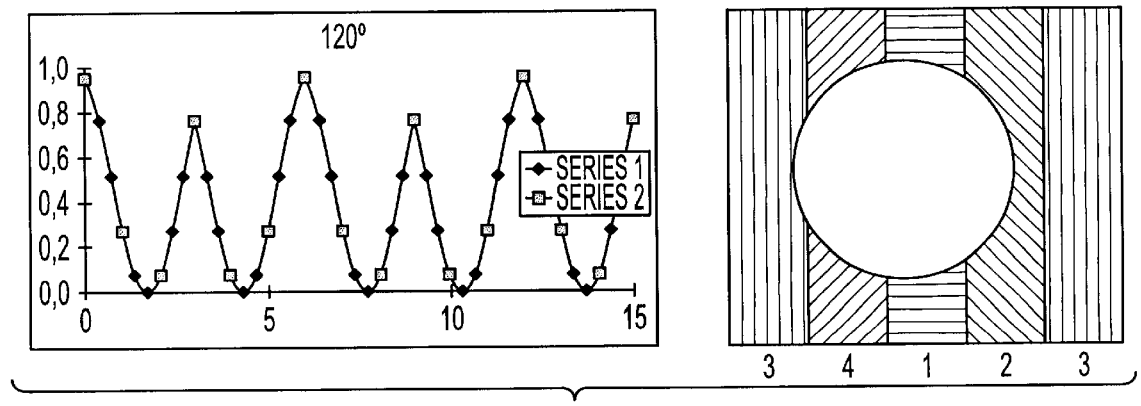
Figure 5G:
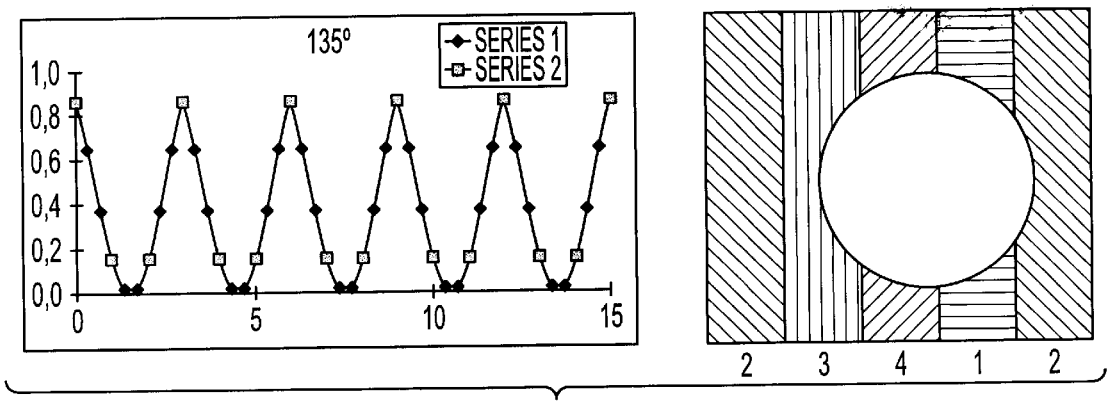
Figure 5H:
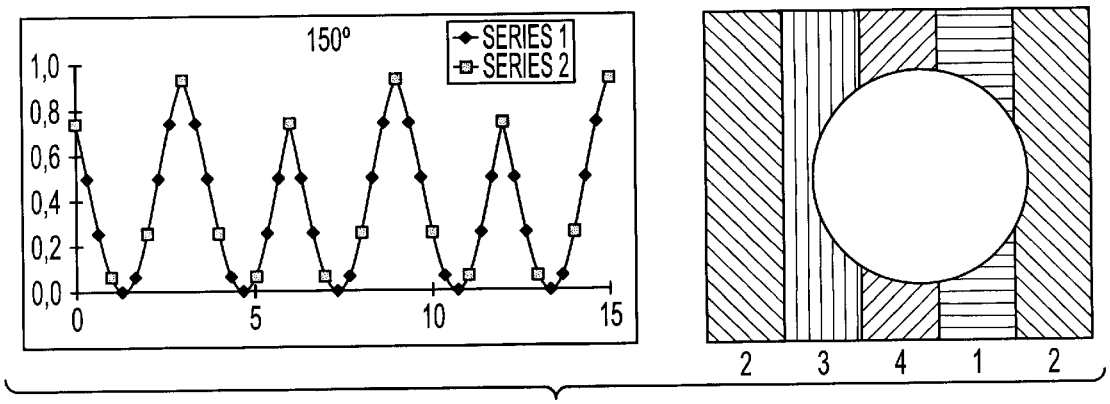
Figure 5I:
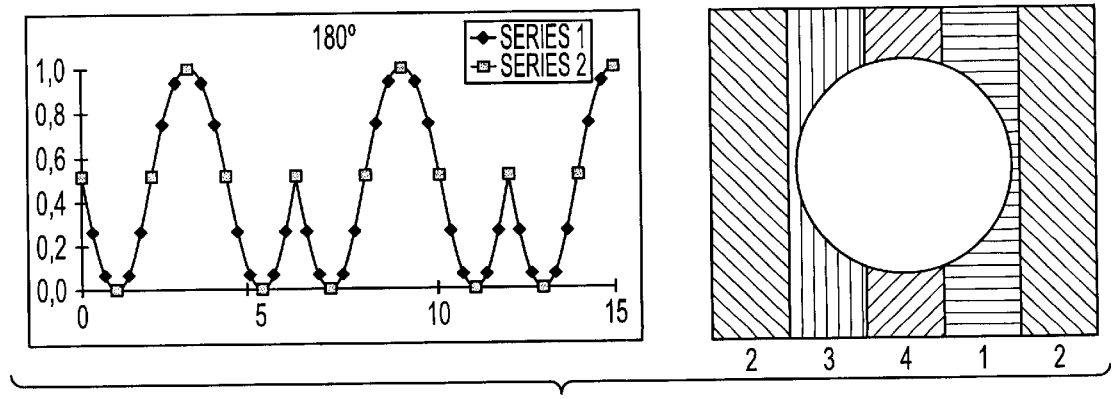

The image sequences illustrated simulate temporally changing light fluxes in the intrinsically stationary pupil image which are caused by a local displacement of the imaged structured surface on the spatial frequency filter, due to a corresponding relative displacement of the pupil image relative to the receivers, which are illustrated as a recurring sequence for this purpose. It can clearly be seen that the carrier frequency is constant, while the phase of the sinusoidal signal changes in accordance with the displacement of the pupil image. The respective phase shifts relative to FIG. 4a are specified in angular degrees in the signal diagrams.

FIGS. 5a–i show an identical representation to that in FIGS. 4a–i, but now for an interrogation cycle according to the pattern 1-2-3-4-4-3-2-1-2- . . . The lower carrier frequency of the fundamental and the superposed first harmonic can clearly be seen given the same clock rate. While the harmonic virtually disappears in the case of a phase shift of the pupil image between 45° and 60°, it completely dominates the signal in the case of a phase shift of 135°. During the signal evaluation, therefore, phase-sensitive rectification must be effected with both carrier frequencies.

What is claimed is:

1. A method for generating a carrier frequency-modulated signal for an evaluation of n photoelectric measurement signals, where n is greater than two, which are generated by imaging a structured surface onto a spatial frequency filter and are phase-shifted with respect to one another, comprising:

serially interrogating amplitudes of the measurement signals in a predetermined interrogation cycle with a constant clock rate resulting in a signal train, and filtering the signal train to form a sinusoidal signal, wherein a carrier frequency of said sinusoidal signal is determined by a time for an interrogation cycle.

2. The method according to claim 1, wherein a clock rate is greater than twice a speed of an amplitude change in an interrogated measurement signal.

3. The method according to claim 1, wherein given n measurement signals which are phase-shifted in each case by 360°/n with respect to one another, the interrogation cycle is effected in an order 1, 2, 3, . . . , n, 1, 2,.

4. The method according to claim 1, wherein given n measurement signals which are phase-shifted in each case by 360°/n with respect to one another, the interrogation cycle is effected in an order 1, 2, 3, . . . , n, n–1, . . . , 2, 1, 2,.

5. The method according to claim 1, wherein a second interrogation cycle is carried out in parallel with the first interrogation cycle, which second interrogation cycle is shifted by one measurement signal given consecutive numbering 1, . . . , n of the measurement signals, and a second signal, phase-shifted by 360°/n, is formed from this signal train.

6. The method according to claim 1, wherein separate pupil areas of the imaging are respectively assigned n measurement signals phase-shifted by 360°/n with respect to one another, the amplitudes, assigned to the respective pupil areas, of the measurement signals are interrogated in parallel in an interrogation cycle and a signal is formed from the signal trains for each pupil area.

7. A method for generating a carrier frequency-modulated signal for an evaluation of n photoelectric measurement signals, where n is greater than two, comprising:

imaging a structured surface onto a spatial frequency filter to generate the measurement signals;

phase-shifting the measurement signals with respect to one another;

cyclically sampling amplitudes of the measurement signals at a constant sampling rate; and forming a sinusoidal signal by filtering a sampled signal train, wherein a carrier frequency of said sinusoidal signal is determined by a sampling cycle period.

8. The method according to claim 7, wherein a sampling rate is at least twice a rate of amplitude change of the measurement signals.

9. The method according to claim 7, further comprising:

performing a second sampling cycle in parallel with the first sampling cycle, wherein the second sampling cycle is shifted by one measurement signal resulting in a second signal that is phase-shifted by 360°/n with respect to a first signal.

10. The method according to claim 7, wherein separate pupil areas of the imaging are respectively assigned n measurement signals phase-shifted by 360°/n with respect to one another and the n measurement signals from each of the separated pupil areas are sampled in parallel to form sample sequences for each pupil area.

11. A device for generating a carrier frequency-modulated signal for an evaluation of n photoelectric measurement signals, where n is greater than two, comprising:

an imaging system to image a structured surface onto a spatial frequency filter and phase-shift the measurement signals with respect to one another;

an evaluation circuit to cyclically sample amplitudes of the measurement signals in a predetermined sampling cycle at a constant sampling rate to produce a sample sequence; and filtering the sample sequence to form a sinusoidal signal having a carrier frequency determined by a sampling cycle period.

12. The device according to claim 11, wherein the sampling rate is at least twice a rate of amplitude change of the measurement signals.

13. The device according to claim 11, wherein the evaluation circuit performs a second sampling cycle in parallel with the first sampling cycle, wherein the second sampling cycle is shifted by one measurement signal resulting in a second signal that is phase-shifted by 360°/n with respect to a first signal.

14. The device according to claim 11, further comprising:

a second evaluation circuit, wherein separate pupil areas of the imaging system are respectively assigned n measurement signals phase-shifted by 360°/n with respect to one another and the n measurement signals from each of the separated pupil areas are sampled in parallel to form sample sequences for each pupil area.

* * * * *

UNITED STATES PATENT AND TRADEMARK OFFICE
CERTIFICATE OF CORRECTION

PATENT NO.    : 6,403,950 B1
DATED         : June 11, 2002
INVENTOR(S)   : Eckart Schneider et al.

It is certified that error appears in the above-identified patent and that said Letters Patent is hereby corrected as shown below:

<u>Title page,</u>
Item [73], change the Assignee from "Corrsys-Datron, Wetzlar (DE)" to
-- CORRSYS-DATRON Sensorsysteme GmbH, Wetzlar (DE) --.

Signed and Sealed this

Thirty-first Day of December, 2002

JAMES E. ROGAN
*Director of the United States Patent and Trademark Office*